Sept. 17, 1929.  W. H. HAUCK  1,728,544
PIPE PULLER FOR WELLS
Filed Jan. 22, 1929
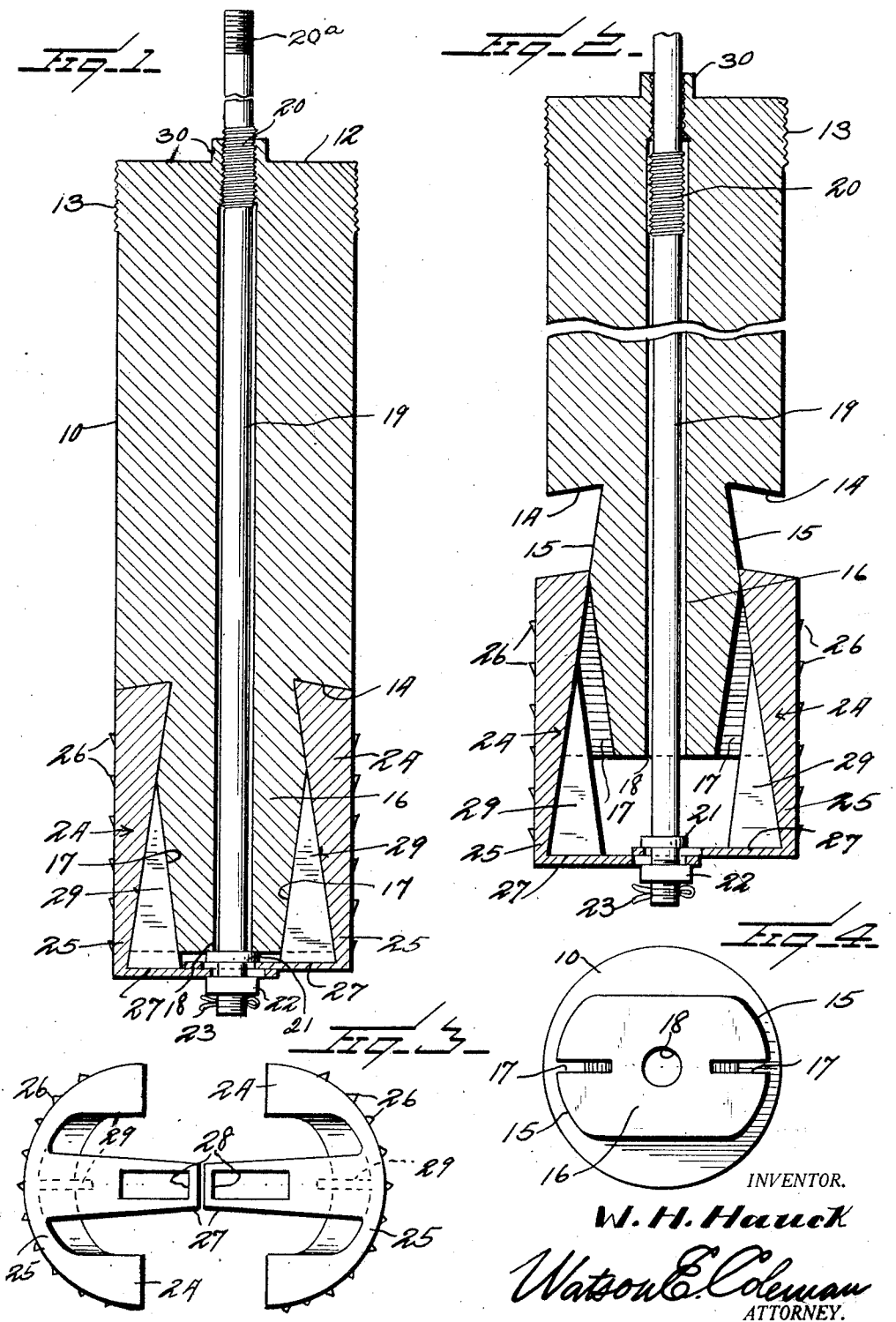

Patented Sept. 17, 1929

1,728,544

UNITED STATES PATENT OFFICE

WILLIAM H. HAUCK, OF UTICA, SOUTH DAKOTA

PIPE PULLER FOR WELLS

Substitute for application Serial No. 204,082, filed July 7, 1927. This application filed January 22, 1929, Serial No. 334,326.

This application is a substitute for application Serial Number 204,082, filed July 7, 1927.

This invention relates to devices for pulling pipes from wells, and particularly to those pullers having a body provided with downwardly and outwardly inclined portions and wedges slidable down these inclined portions but acting to wedge against the inner face of the pipe to be pulled when the puller is raised.

The general object of the present invention is to provide improved means for this purpose which includes a rod which operatively shifts the wedging devices so that as the rod is lowered the wedging devices or body will be lowered and as the rod is raised the wedging devices and the body will be pulled out with the well tube or pipe.

My invention is illustrated in the accompanying drawing, wherein:—

Figure 1 is a vertical sectional view through a pipe puller constructed in accordance with my invention;

Figure 2 is a like view to Figure 1 but showing the pulling dogs in their expanded position;

Figure 3 is a bottom plan view of the pulling dogs;

Figure 4 is a bottom plan view of the body of the device.

Referring to the drawing, 10 designates a body formed with a central bore 11, the upper end of the bore being screw-threaded, as at 12. The upper end of the body is formed with exterior screw-threads 13 whereby a pipe may be engaged with the upper end of the hollow body to raise or lower the body into the well. The lower end of the body is cut away at 14 on opposite sides. This lower end of the body, as shown in Figure 4, has curved end faces and flattened side faces and the curved end faces 15 extend upward and inward. The lower ends of the portions 16 which are defined by the cut-away portions 14 are formed with the inwardly extending kerfs 17 and with a central aperture 18.

Extending downward through the entire length of the body and out from the opening 18 is a rod 19, which somewhat below its upper end is formed with a relatively short screw-threaded portion 20 and above this screw-threaded portion 20 there is a screw-threaded portion $20^a$. The screw-threaded portion 20 projects out beyond this screw-threaded rod. The lower end of this rod carries upon it a collar 21 and below this collar there is provided a nut 22 which engages the screw-threaded end of the rod and there is provided the key 23 which holds this nut in place against accidental removal.

Mounted upon the exterior faces of the rounded ends 15 are the two dogs or wedges 24, each dog or wedge being approximately crescent-shaped in cross section so as to embrace the portions 16. Each dog tapers along the middle line from the top of the dog downward so that this middle portion 25 of the dog is tapered to the same taper as the upward taper of the portion 16.

It will be obvious now that when these dogs are in a raised position, the outer faces of the dogs will be flush with the outer face of the cylindrical portion 10 but that as the dogs are shifted downward they will project out from this cylindrical portion. These dogs upon their outer faces are provided with outwardly projecting teeth 26, the lower end of each dog being formed with a transversely extending lug 27 which is longitudinally slotted, as at 28, and the middle of each dog at its lower end is provided with the inwardly projecting fin 29 disposed parallel to the length of the dog and engaging in the corresponding kerf 17.

It will be obvious now that if the dogs be forced downward, they will likewise move outward and will bite into the inner face of the surrounding pipe, and that then if the body 10 be raised, the pipe will be raised. The rod 19 is for the purpose of holding the wedges or dogs 24 raised when lowering the device into the well and then forcing the dogs downward and into contact with the well casing or pipe. The threads 20 engage the nut 30 which is carried upon the web 12 and the rod 19 is normally held up by this engagement and the dogs 24 are normally held up by this engagement.

The body 10 is engaged at the threads 13 by the drill rods or like elements and in case it be desired to pull up a length of pipe, the body 10 is lowered into the well by means of the drill rods and when it is sufficiently lowered, the rod 19, which may form an extension of the pump rod, is rotated until it has cleared the nut or equivalent screw-threaded member 30.

When this has been done, the rod 19 drops downward of its own weight and the collar 21 engaging the lugs 27 pulls the dogs downward and they are forced laterally outward. The greater the upward pull upon the body 10, the more tightly these dogs will wedge in place and thus the well pipe may be readily pulled. After the pipe has been pulled out a certain distance, the well pipe may be held from downward movement and the action repeated. It will be seen that the aperture 28 in the overlapping lugs is elongated so as to permit the dogs to shift laterally.

The screw-threads 20$^a$ are for the purpose of engaging a pump rod with the rod 19 and these threads 20$^a$ are located as far above the threads 20 as the wedges are long in order to give it enough room to drop. Each puller is made for one kind of pipe, three inches for three-inch pipe, two inches for two-inch pipe, etc.

While I have illustrated a construction which I believe to be particularly effective for the purpose intended, I do not wish to be limited to the exact details shown except as defined in the appended claims.

I claim:—

1. A pipe puller for wells including a body having means at its upper end whereby it may be connected to a drill rod, the lower end of the body being cut away to provide opposed upwardly inclined faces defining a downwardly extending wedge-shaped portion of the body, dogs fitting said faces and wedge-shaped from top to bottom, each dog being provided with outwardly projecting teeth upon its outer face, inwardly extending overlapping slotted lugs attached to the dogs, a longitudinally extending rod extending downward through the body and having a relatively short screw-thread intermediate its ends adapted to engage with the upper end of the body, the lower end of said rod being formed with a collar, the lower end of the rod passing through the slots in the lugs, and a nut holding the slotted lugs in place upon the rod.

2. A pipe puller of the character described including a body screw-threaded at its upper end for engagement with a drill rod, the lower end of the body being cut away upon its opposite faces to provide two transversely curved faces, a rod extending downwardly entirely through the body, the rod intermediate its ends being formed with a relatively short screw-thread larger than the diameter of the rod and having screw-threaded engagement with the upper end of the body, transversely curved dogs fitting around the cut-away portion of the body and having middle portions tapered downwardly, said dogs being formed with teeth upon their outer faces and the lower ends of the dogs having inwardly extending overlapping lugs formed with coincident slots through which the rod passes, means for holding the dogs from rotation upon the body, and means on the rod between which the lugs of the dogs are detachably engaged.

3. A pipe puller of the character described including a body screw-threaded at its upper end for engagement with a drill rod, the lower end of the body being cut away upon its opposite faces to provide two transversely curved faces, a rod extending downward entirely through the body, the rod intermediate its ends being formed with a relatively short screw-thread larger than the diameter of the rod and having screw-threaded engagement with the upper end of the body, transversely curved dogs fitting around the cut-away portion of the body and having middle portions tapered downwardly, said dogs being formed with teeth upon their outer faces and the lower ends of the dogs having inwardly extending overlapping lugs formed with coincident slots through which the rod passes, a fin projecting inward from the middle portion of each dog at its lower end, the central lower end of the body being formed with radially extending kerfs into which said fins project, and means on the rod between which the lugs of the dogs are detachably engaged.

In testimony whereof I hereunto affix my signature.

WILLIAM H. HAUCK.